United States Patent
Fukada

(10) Patent No.: US 7,634,401 B2
(45) Date of Patent: Dec. 15, 2009

(54) SPEECH RECOGNITION METHOD FOR DETERMINING MISSING SPEECH

(75) Inventor: Toshiaki Fukada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 731 days.

(21) Appl. No.: 11/368,986

(22) Filed: Mar. 6, 2006

(65) Prior Publication Data

US 2006/0206326 A1  Sep. 14, 2006

(30) Foreign Application Priority Data

Mar. 9, 2005 (JP) ............... 2005-065355

(51) Int. Cl.
  *G10L 15/20* (2006.01)
  *G10L 11/02* (2006.01)
(52) U.S. Cl. .............. 704/215; 704/254; 704/255
(58) Field of Classification Search ............. 704/243, 704/248, 253, 255, 256, 256.4, 275, 210, 704/213, 215, 254
See application file for complete search history.

(56) References Cited

U.S. PATENT DOCUMENTS

| | | | | |
|---|---|---|---|---|
| 4,712,242 A | * | 12/1987 | Rajasekaran et al. | 704/253 |
| 4,761,815 A | * | 8/1988 | Hitchcock | 704/253 |
| 4,882,757 A | * | 11/1989 | Fisher et al. | 704/253 |
| 5,191,635 A | | 3/1993 | Fujimoto et al. | |
| 5,295,190 A | * | 3/1994 | Yamashita et al. | 704/248 |
| 5,634,083 A | * | 5/1997 | Oerder | 704/253 |
| 5,692,104 A | * | 11/1997 | Chow et al. | 704/253 |
| 5,774,851 A | * | 6/1998 | Miyashiba et al. | 704/252 |
| 5,835,890 A | * | 11/1998 | Matsui et al. | 704/255 |
| 6,167,374 A | * | 12/2000 | Shaffer et al. | 704/227 |
| 6,389,394 B1 | | 5/2002 | Fanty | |
| 6,708,150 B1 | * | 3/2004 | Hirayama et al. | 704/243 |
| 7,024,360 B2 | * | 4/2006 | Savic et al. | 704/256 |
| 7,308,404 B2 | * | 12/2007 | Venkataraman et al. | 704/255 |
| 7,421,394 B2 | * | 9/2008 | Omi et al. | 704/277 |
| 2002/0021789 A1 | * | 2/2002 | Nguyen | 379/88.01 |
| 2002/0173957 A1 | | 11/2002 | Kawane et al. | |
| 2004/0267521 A1 | | 12/2004 | Ross et al. | |
| 2005/0033571 A1 | * | 2/2005 | Huang et al. | 704/231 |

(Continued)

FOREIGN PATENT DOCUMENTS

EP  1083545 A2  3/2001

(Continued)

OTHER PUBLICATIONS

Balentine, B., & Morgan, D. P., How to build a speech recognition application: a style guide for telephony dialogues, (1999), pp. 141-145, Enterprise Integration Group, San Ramon, Calif.

(Continued)

*Primary Examiner*—Martin Lerner
(74) *Attorney, Agent, or Firm*—Canon U.S.A. Inc., I.P. Division

(57) ABSTRACT

A speech recognition method comprises importation of speech made by a user. This importation is started in accordance with the user's operation or movement. It is then determined whether beginning of the imported speech is present or missing. Pronunciation information of a target word to be recognized is set based on a result of a speech determination unit, and the imported speech is recognized using the set pronunciation information.

13 Claims, 10 Drawing Sheets

U.S. PATENT DOCUMENTS

| | | |
|---|---|---|
| 2005/0033574 A1 | 2/2005 | Kim et al. |
| 2007/0078652 A1* | 4/2007 | Chang et al. ................ 704/234 |
| 2008/0021707 A1* | 1/2008 | Bou-Ghazale et al. ...... 704/248 |
| 2008/0077400 A1* | 3/2008 | Yamamoto et al. .......... 704/211 |
| 2008/0109225 A1* | 5/2008 | Sato ........................... 704/260 |

FOREIGN PATENT DOCUMENTS

| | | |
|---|---|---|
| EP | 1503368 A1 | 2/2005 |
| JP | 02-184915 A | 7/1990 |
| JP | 10-069291 A | 3/1998 |
| KR | 2002-0033791 A | 5/2002 |
| KR | 2005-0015586 A | 2/2005 |

OTHER PUBLICATIONS

Fukada, et al., "Automatic Generation of Multiple Pronunciations based on Neural Networks", Speech Communication, Feb. 1999, pp. 63-73, vol. 27, No. 1, Elsevier Science Publisher, Amsterdam, NL.

* cited by examiner

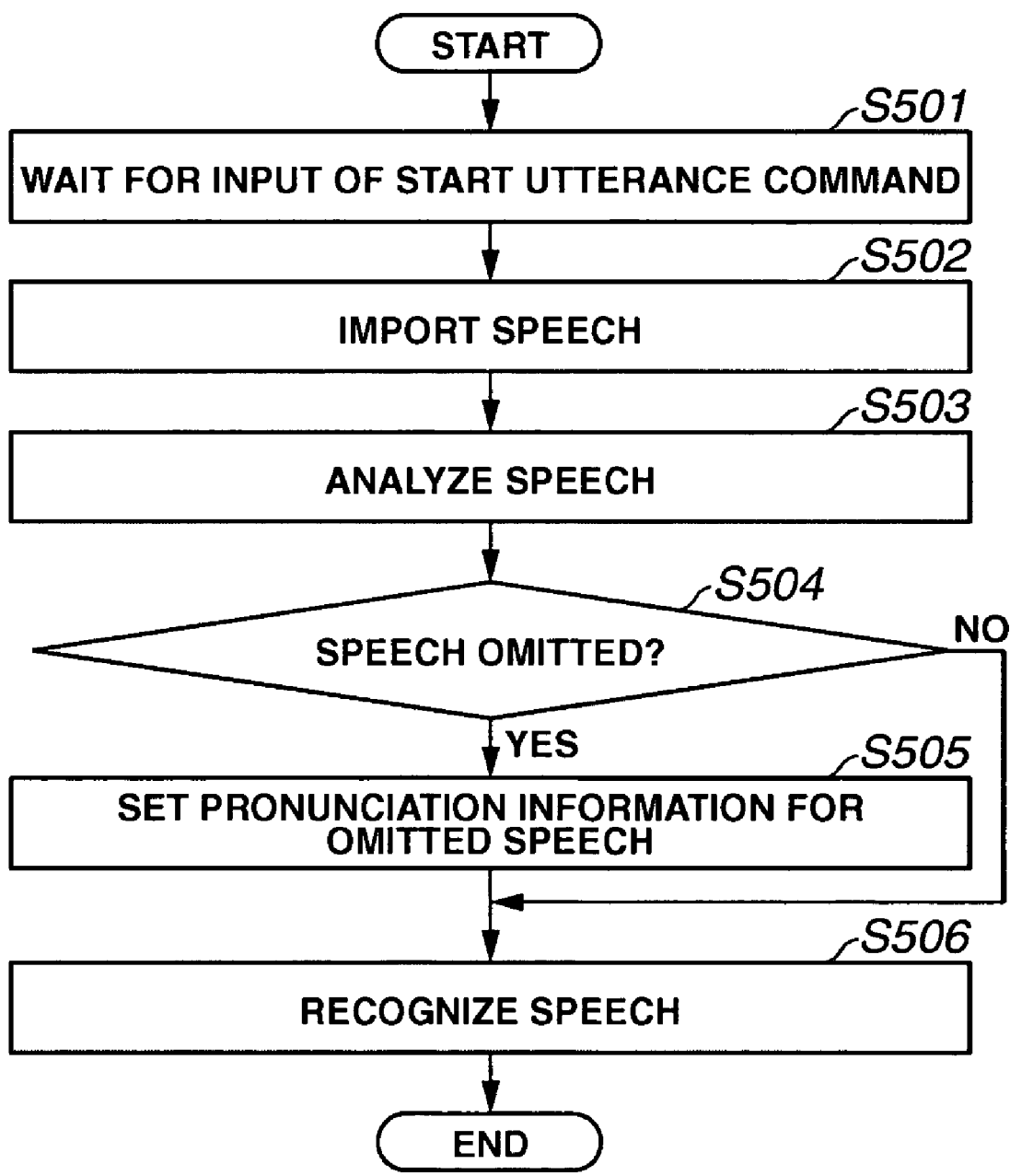

NO SPEECH OMISSION (NORMAL IMPORT)

SPEECH OMISSION

FIG.7

| WORD ID | TRANSCRIPTION | PRONUNCIATION |
|---|---|---|
| 001 | TOKYO | tookyoo |
| 002 | HIROSHIMA | hiroshima |
| 003 | TOKUSHIMA | tokushima |
| 004 | TU | tsu |

FIG.8

| WORD ID | TRANSCRIPTION | PRONUNCIATION |
|---|---|---|
| 101 | TOKYO | ookyoo |
| 102 | HIROSHIMA | iroshima |
| 103 | TOKUSHIMA | okushima |
| 104 | TU | u |

FIG.9

| WORD ID | TRANSCRIPTION | PRONUNCIATION |
|---|---|---|
| 201 | TOKYO | okyoo |
| 202 | HIROSHIMA | roshima |
| 203 | TOKUSHIMA | kushima |
| 204 | TU | SIL |

FIG.10

| WORD ID | TRANSCRIPTION | PRONUNCIATION |
|---|---|---|
| 401 | TOKYO | yoo |
| 402 | HIROSHIMA | shima |
| 403 | TOKUSHIMA | shima |
| 404 | TU | SIL |

FIG.11

| WORD ID | TRANSCRIPTION | PRONUNCIATION |
|---|---|---|
| 001 | TOKYO | tookyoo |
| 101 | TOKYO | ookyoo |
| 201 | TOKYO | okyoo |
| 301 | TOKYO | kyoo |
| 401 | TOKYO | yoo |
| 002 | HIROSHIMA | hiroshima |
| 102 | HIROSHIMA | iroshima |
| 202 | HIROSHIMA | roshima |
| 302 | HIROSHIMA | oshima |
| 402 | HIROSHIMA | shima |
| 003 | TOKUSHIMA | tokushima |
| 103 | TOKUSHIMA | okushima |
| 203 | TOKUSHIMA | kushima |
| 303 | TOKUSHIMA | ushima |
| 403 | TOKUSHIMA | shima |
| 004 | TU | tsu |
| 104 | TU | u |
| 204 | TU | SIL |

/t/

| WORD ID | TRANSCRIPTION | STATE SEQUENCE |
|---|---|---|
| 001 | TOKYO | t1 t2 t3 o1 o2 o3 o1 ... |
| 002 | HIROSHIMA | h1 h2 h3 i1 i2 i3 r1 ... |
| 003 | TOKUSHIMA | t1 t2 t3 o1 o2 o3 k1 ... |
| 004 | TU | ts1 ts2 ts3 u1 u2 u3 |
| : | : | : |

| WORD ID | TRANSCRIPTION | STATE SEQUENCE |
|---|---|---|
| 101 | TOKYO | t2 t3 o1 o2 o3 o1 ... |
| 102 | HIROSHIMA | h2 h3 i1 i2 i3 r1 ... |
| 103 | TOKUSHIMA | t2 t3 o1 o2 o3 k1 ... |
| 104 | TU | ts2 ts3 u1 u2 u3 |
| : | : | : |

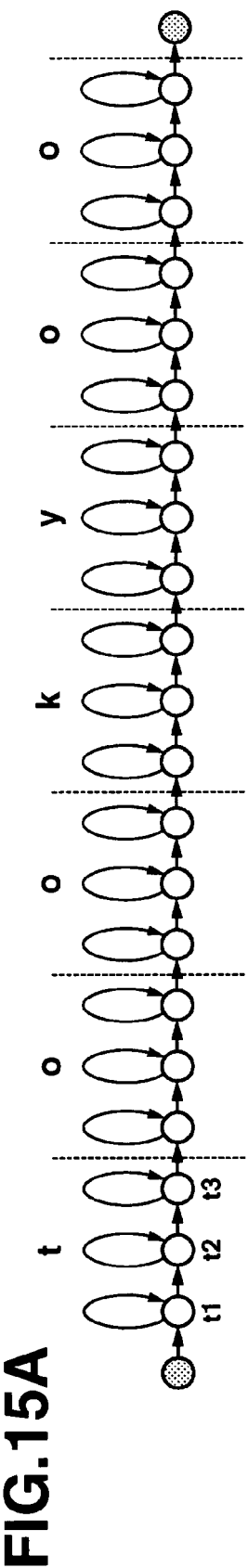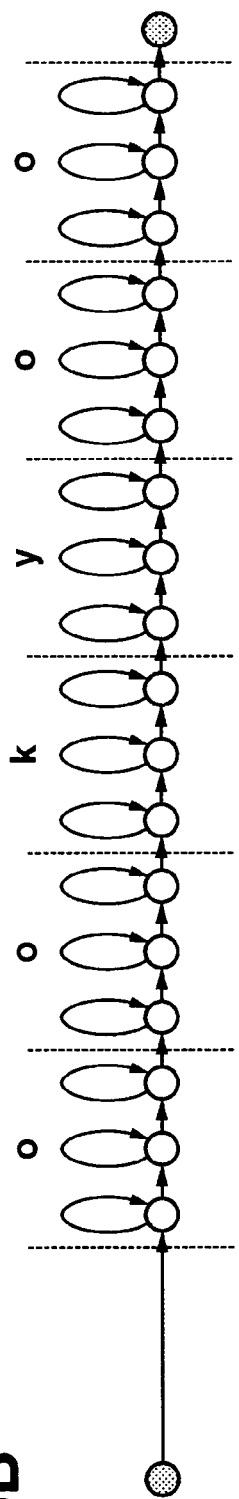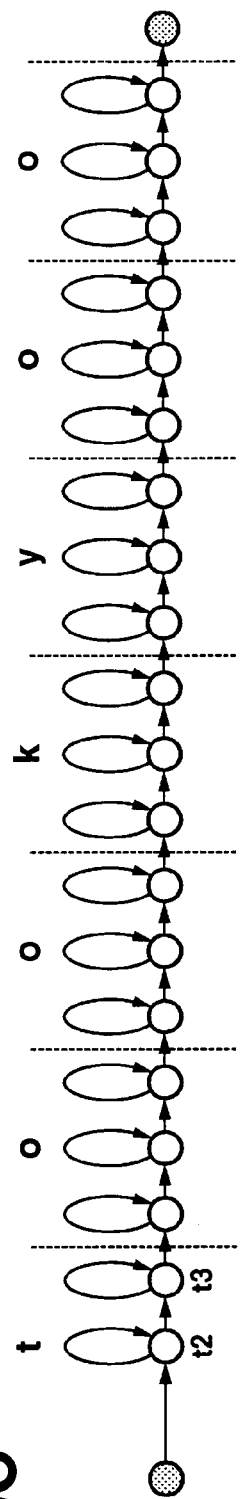
FIG.15A
FIG.15B
FIG.15C

FIG.16A

REFERENCE PATTERN "TOKYO" (t=1, ......, T1)

| c1(1) | c1(2) | c1(3) |
|---|---|---|
| c2(1) | c2(2) | c2(3) |
| ... | ... | ... |
| c12(1) | c12(2) | c12(3) |
| $\Delta$c1(1) | $\Delta$c1(2) | $\Delta$c1(3) |
| $\Delta$c2(1) | $\Delta$c2(2) | $\Delta$c2(3) |
| ... | ... | ... |
| $\Delta$c12(1) | $\Delta$c12(2) | $\Delta$c12(3) |

---------------

| c1(T1-1) | c1(T1) |
|---|---|
| c2(T1-1) | c2(T1) |
| ... | ... |
| c12(T1-1) | c12(T1) |
| $\Delta$c1(T1-1) | $\Delta$c1(T1) |
| $\Delta$c2(T1-1) | $\Delta$c2(T1) |
| ... | ... |
| $\Delta$c12(T1-1) | $\Delta$c12(T1) |

FIG.16B

REFERENCE PATTERN "TOKYO" (t=2, ......, T1)

| c1(2) | c1(3) |
|---|---|
| c2(2) | c2(3) |
| ... | ... |
| c12(2) | c12(3) |
| $\Delta$c1(2) | $\Delta$c1(3) |
| $\Delta$c2(2) | $\Delta$c2(3) |
| ... | ... |
| $\Delta$c12(2) | $\Delta$c12(3) |

---------------

| c1(T1-1) | c1(T1) |
|---|---|
| c2(T1-1) | c2(T1) |
| ... | ... |
| c12(T1-1) | c12(T1) |
| $\Delta$c1(T1-1) | $\Delta$c1(T1) |
| $\Delta$c2(T1-1) | $\Delta$c2(T1) |
| ... | ... |
| $\Delta$c12(T1-1) | $\Delta$c12(T1) |

FIG.16C

REFERENCE PATTERN "TOKYO" (t=3, ......, T1)

| c1(3) |
|---|
| c2(3) |
| ... |
| c12(3) |
| $\Delta$c1(3) |
| $\Delta$c2(3) |
| ... |
| $\Delta$c12(3) |

---------------

| c1(T1-1) | c1(T1) |
|---|---|
| c2(T1-1) | c2(T1) |
| ... | ... |
| c12(T1-1) | c12(T1) |
| $\Delta$c1(T1-1) | $\Delta$c1(T1) |
| $\Delta$c2(T1-1) | $\Delta$c2(T1) |
| ... | ... |
| $\Delta$c12(T1-1) | $\Delta$c12(T1) |

SPEECH RECOGNITION METHOD FOR DETERMINING MISSING SPEECH

BACKGROUND OF THE INVENTION

1. Field of the Invention

The present invention relates to a method for realizing high-accuracy speech recognition in which speech recognition including an input of a command to start speech, such as a button depression, is performed, and a speech can be made before depressing the button.

2. Description of the Related Art

When speech recognition is performed, it is necessary to set a distance between the user's mouth and microphone, and an input level appropriately, as well as properly inputting a command to start speech (usually by depressing a button), in order to prevent errors due to ambient noise. If these are not done appropriately, there will be a substantial degradation in the recognition performance. However, users do not always make such settings or input properly, and it becomes necessary to take measures to prevent performance degradation in these cases. In particular, sometimes the command to start speech is not inputted correctly, for example, the speech is made before the button is depressed. In such a case, the beginning of the speech will be omitted since the speech is imported through the microphone after the command to start speech is inputted. When conventional speech recognition is performed based on the omitted speech, the recognition rate will drop greatly in comparison to the case where the command to start speech is inputted correctly.

In consideration of such a problem, Japanese patent No. 2829014 discusses a method which provides a ring buffer that at all times imports speech of a constant length, besides a data buffer for storing speech data imported after the command to start the recognition process is inputted. After the command is inputted, a head of the speech is detected using the speech imported by the data buffer. In the case where the head of the speech is not detected, the detection of the speech head is conducted by using in addition the speech before the command was inputted, which is stored in the ring buffer. In this method, since the ring buffer has to constantly perform a speech importing process, an additional CPU load is required as compared to the case where only the data buffer is employed. That is, it is not necessarily a suitable method for use in battery-operated devices such as mobile devices.

Furthermore, Japanese patent No. 3588929 discusses a method in which a word with a semi-syllable or a mono-syllable omitted at the beginning of the word is also a target to be recognized. In this manner, degradation of the speech recognition rate is prevented in a noisy environment. Moreover, Japanese patent No. 3588929 discusses a method for performing control to determine whether a word with an omitted head portion should be the target word to be recognized depending on the noise level. In this method, determination as to whether to omit a semi-syllable or a mono-syllable at the beginning of the word is made based on the type of the semi-syllable or the mono-syllable at the beginning of the word or the noise level. If it is determined to make an omission, the word without an omission is not appointed as the target word to be recognized. Additionally, when it is determined whether to omit the beginning of the word, it is not considered whether the command to start speech inputted by the user's operation or movement is performing correctly. Therefore, in Japanese patent No. 3588929, the omission of the beginning of the word is up to one syllable, and in a quiet environment, the beginning of the word is not omitted. As a result, in the case where a speech is made before the button is depressed, and, for example, two syllables in the speech are omitted in a quiet atmosphere, the degradation of recognition performance cannot be avoided.

In view of the above problem, the object of the present invention is directed to a method to prevent degradation of the recognition performance by a simple and easy process in the case where the beginning of a speech is missing or omitted. Such omission occurs when the command to start speech is improperly input by a user.

SUMMARY OF THE INVENTION

An aspect of the present invention is a speech recognition method comprising steps of starting import of speech made by a user in accordance with user input, determining whether beginning of the imported speech is missing, setting pronunciation information of a target word to be recognized based on a result of the determining step, and recognizing the imported speech using the set pronunciation information.

Another aspect of the present invention is a speech recognition method comprising steps of starting import of speech made by a user according to user input, determining whether the import of speech is started in the midst of speech made by the user, setting a pronunciation information of a target word to be recognized based on a result of the determining step, and recognizing the imported speech using the set pronunciation information.

Yet another aspect of the present invention is a speech recognition apparatus comprising a speech import unit for starting import of speech made by a user according to user input, a determination unit for determining whether beginning of the imported speech is missing, a setting unit for setting a pronunciation information of a target word to be recognized based on a result of the determination unit, and a speech recognition unit for recognizing the imported speech using the set pronunciation information.

Yet another aspect of the invention is a speech recognition apparatus comprising a speech import unit for starting import of speech made by a user according to user input, a determination unit for determining whether the import of speech is started in the midst of the user's speech, a setting unit for setting pronunciation information of a target word to be recognized based on a result of the determination unit, and the speech recognition unit for recognizing the imported speech using the set pronunciation information.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments of the invention and, together with the description, serve to explain the principles of the invention.

FIG. 5 is a flowchart of the entire process of the speech recognition method according to the first exemplary embodiment of the present invention.

FIG. 7 is an example of target words to be recognized.

FIG. 8 is an example of the target words to be recognized in FIG. 7, in which the first pronunciation sequences have been deleted.

FIG. 9 is an example of the target word to be recognized in FIG. 7, in which the first and second pronunciation sequences have been deleted.

FIG. 10 is an example of the target words to be recognized in FIG. 7, in which first to fourth pronunciation sequences have been deleted.

FIG. 11 is an example of all combinations as to the target words to be recognized in FIG. 7, in which the first to the fourth pronunciation sequences have been deleted.

FIGS. 15A, 15B, and 15C are schematic diagrams illustrating the difference between the deletion of pronunciation sequences and the deletion of state sequences.

FIGS. 16A, 16B, and 16C are schematic diagrams illustrating how the pronunciation information is set by the deletion of the reference pattern sequence.

DETAILED DESCRIPTION OF THE EXEMPLARY EMBODIMENTS

Exemplary embodiments of the invention will be described in detail below with reference to the drawings.

First Exemplary Embodiment

Figure 1:
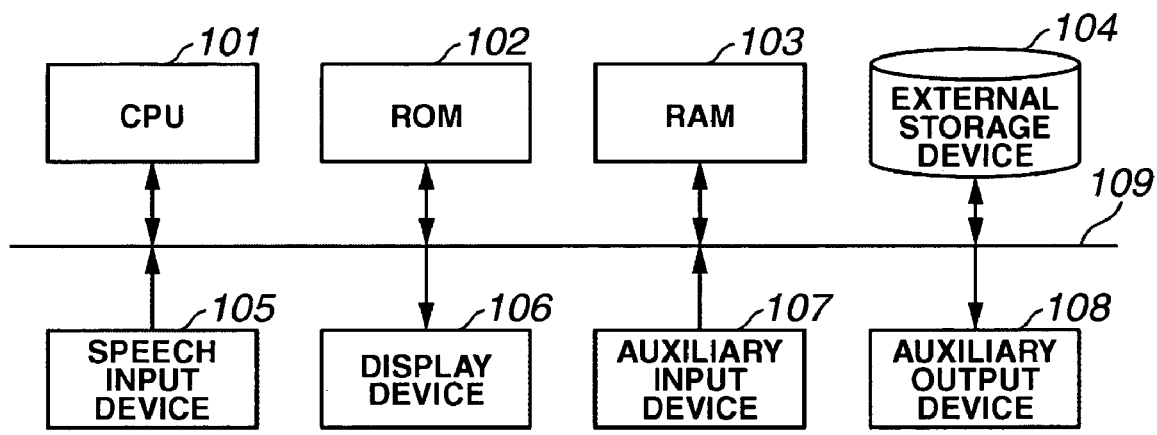
FIG. 1 is a block diagram of the hardware configuration of an information device in which the speech recognition method according to the first exemplary embodiment of the present invention is installed.

FIG. 1 is a block diagram of a speech recognition apparatus according to the first exemplary embodiment of the present invention. A CPU 101 performs various control functions in the speech recognition apparatus in accordance with a control program stored in a ROM 102 or loaded from an external storage device 104 onto a RAM 103. The ROM 102 stores various parameters and the control program executed by the CPU 101. The RAM 103 provides a work area when the CPU 101 is performing various control functions, and also stores the control program executed by the CPU 101. The method shown in the flowchart of FIG. 5 is preferably a program executed by CPU 101 and stored in ROM 102, RAM 103, or storage device 104.

Reference numeral 104 denotes an external storage device such as a hard disk, floppy disk, CD-ROM, DVD-ROM, and memory card. In the case where the external storage device 104 is a hard disk, it stores various programs installed from a CD-ROM or a floppy disk. A speech input device 105, such as a microphone, imports speech on which speech recognition is to be performed. A display device 106, such as a CRT or LCD performs setting of process contents, displays input information, and outputs process results. An auxiliary input device 107, such as a button, ten key, keyboard, mouse, or pen, is used to give instructions to start importing speech made by a user. An auxiliary output device 108, such as a speaker, is used to confirm speech recognition result by voice. A bus 109 connects all of the above devices. The target speech to be recognized can be inputted through the speech input device 105, or can be acquired by other devices or units. The target speech acquired by other devices or units are retained in the ROM 102, RAM 103, external storage device 104, or an external device connected through a network.

Figure 2:
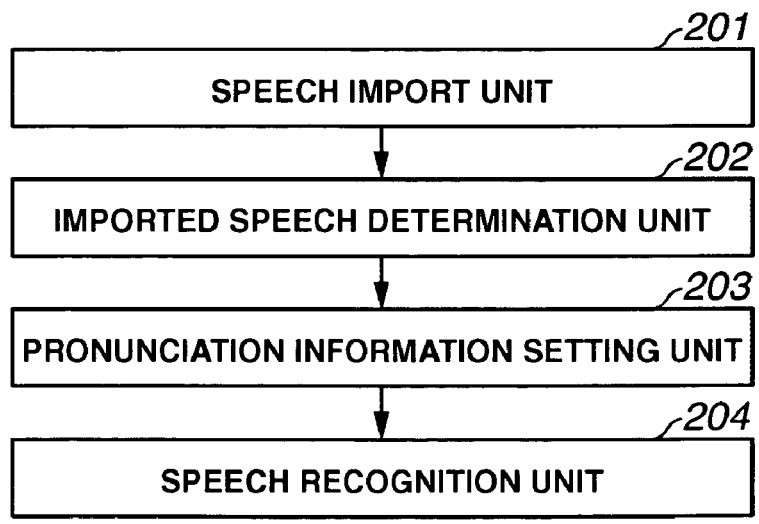
FIG. 2 is a block diagram of the module configuration of the speech recognition method according to the first exemplary embodiment of the present invention.

FIG. 2 is a block diagram of the module configuration of the speech recognition method. A speech import unit 201 imports speech inputted through a microphone of the speech input device 105. Instruction to start import of speech is given by the user's operation such as depressing a button in the auxiliary input device 107. An imported speech determination unit 202 determines whether the beginning or beginning part of the speech imported by the speech import unit is missing or omitted. A pronunciation information setting unit 203 sets the pronunciation information of the target word based on a result of the imported speech determination unit 202. A speech recognition unit 204 recognizes the speech imported by the speech import unit 201 using the pronunciation information set by the pronunciation information setting unit 203.

Figure 3:
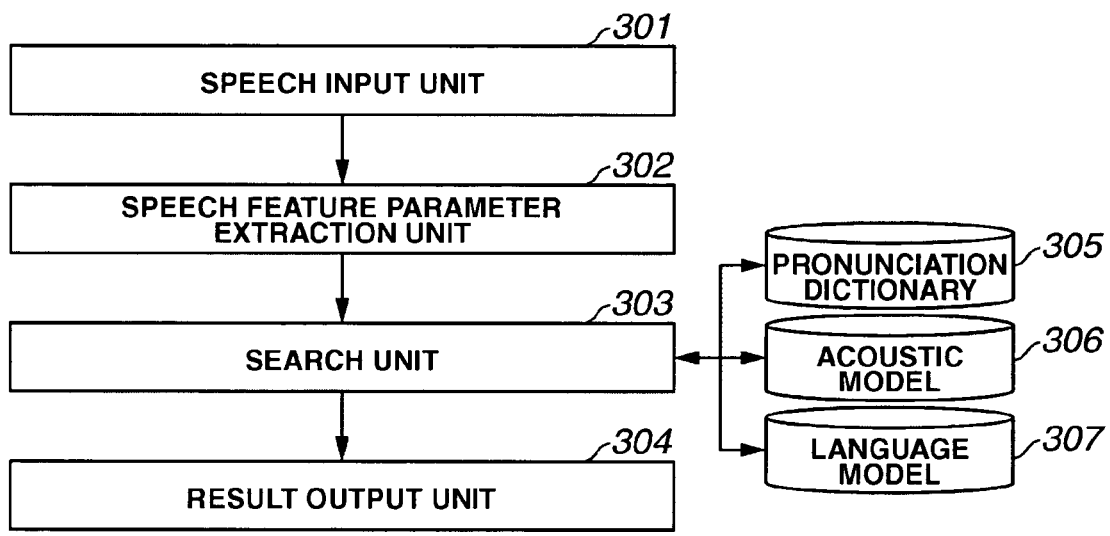
FIG. 3 is a block diagram of the module configuration of a typical, speech recognition method of the type not requiring registration.

FIG. 3 is a block diagram of the module for a typical speech recognition method used in recognizing non-registered speech or speaker-independent speech. A speech input unit 301 recognizes speech inputted through the speech input device 105. A speech feature parameter extraction unit 302 performs a spectral analysis on the speech inputted by the speech input unit 301 and extracts the feature parameter. A pronunciation dictionary 305 retains the pronunciation information of the target word to be recognized. An acoustic model 306 retains phoneme models (or syllable models, or word models), and the reference pattern of the target word to be recognized is constructed using the acoustic model according to the pronunciation information of the pronunciation dictionary 305. A language model 307 retains a word list and word connection probability (or grammatical restriction). The search unit 303 calculates the distance between the reference pattern, which is configured from the pronunciation dictionary 305 using the language model 307, and the feature parameter of the speech obtained by the speech feature parameter extraction unit 302. The search unit 303 also calculates likelihood, or performs the search process. The result output unit 304 displays the result obtained by the search unit 303 on the display device 106, outputs the result as speech on the auxiliary output device 108, or outputs the recognition result in order to perform a predetermined operation. The setting of the pronunciation information by the pronunciation information setting unit 203 corresponds to the setting of the pronunciation dictionary 305.

FIG. 5 is a flowchart of the entire process of the speech recognition method. The entire process is illustrated in detail with the flowchart. In Step S501, the input of the command to start speech is waited for. The command is inputted according to the user's operation or movement. The command input can take any means which allows the user to give instructions to start speech, for example, depressing a button such as a ten key, keyboard, or a switch, clicking a mouse, or pressing on a touch panel. Additionally, if a sensor such as a light sensor including infrared sensor, antenna sensor, or ultrasonic sensor is utilized, the movement of the user who is getting close to the speech recognition device can be detected. If such movement of the user is regarded as the command to start speech, the detection by the sensor can be used as the command to start speech. The command in step S501 triggers the speech import through a microphone in step S502. In step S504, it is determined whether the beginning of the imported speech is omitted, and the speech analysis required for this determination is performed in step S503.

Figure 6A:
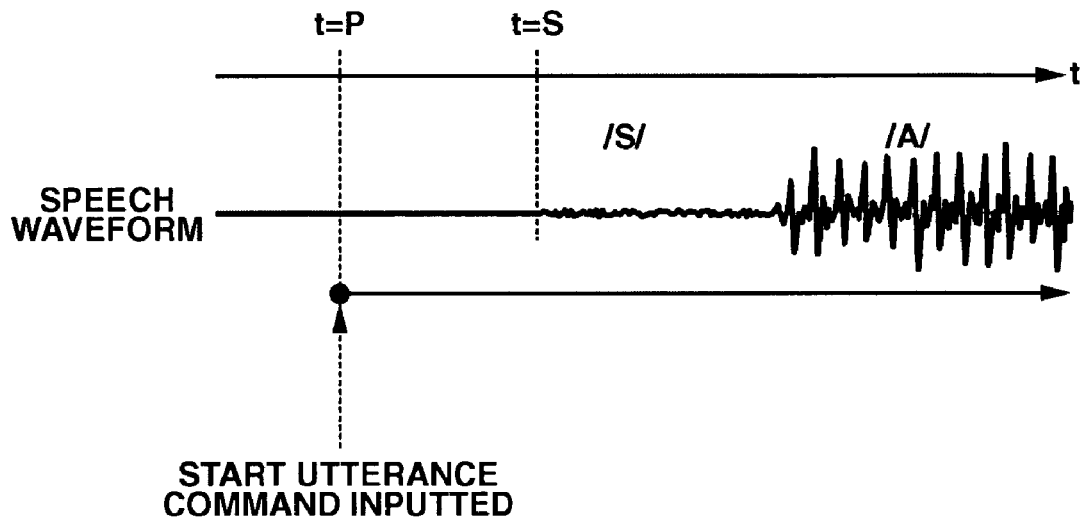
FIGS. 6A and 6B are schematic diagrams of speech omission due to the difference in the timing of inputting the command to start utterance.
Figure 6B:
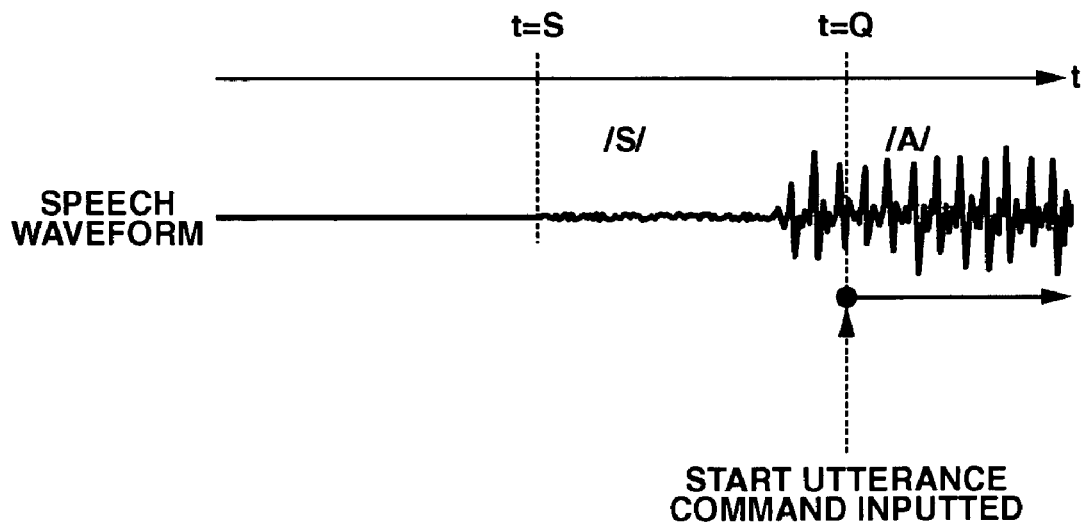

FIGS. 6A and 6B are schematic diagrams of speech omission due to the difference in the timing of inputting the command to start speech. The horizontal axis is a time scale, and speech starts at time S. FIG. 6A is a case where the command to start speech is inputted at time P (P<S). Since the speech import can be started at time P (or immediately after P), speech is not omitted and is imported properly. On the other hand, FIG. 6B is a case where the command to start speech is inputted at time Q (S<Q). Since the speech import starts at time Q (or immediately after Q) in this case, the beginning of the speech is omitted. The speech analysis and the determination whether the beginning of the speech is omitted are conducted by the following method.

There are various methods for performing speech analysis and determination. A simple and easy method is to calculate the waveform power using the head portion of the imported speech waveform (such as 300 samples) and compare the result with a predetermined threshold value. If the result exceeds the threshold value, it can be determined that the beginning of the speech is omitted. Determination can also be made by performing other analyses such as zero-crossing rate analysis, spectral analysis, or fundamental frequency analysis.

The zero-crossing rate can be obtained by expressing the imported speech data with codes (for example, in the case of 16 bit, signed short, the values between −32768 and 32767 are taken) and by counting a number of times the codes change. The zero-crossing rate is obtained as to the head portion of the speech waveform and the result is compared with the threshold value as the waveform power described above. Thus, the beginning of the speech can be determined to be omitted if the result is greater than the threshold value, and to be not omitted if the result is less than or equal to the threshold value.

The spectral analysis can be performed, for example, in the same way as the feature parameter extraction of the speech recognition in the speech recognition feature parameter extraction unit 302. Next, the likelihood (or the probability) of the speech model and the non-speech model is obtained using the extracted feature parameter, and if the likelihood of the speech model is greater than that of the non-speech model, the speech is determined to be omitted. If the likelihood of the speech model is less than that of the non-speech model, the speech is determined to be not omitted. The speech model and the non-speech model are prepared beforehand from the feature parameters of the speech portion and the feature parameters of the non-speech portion as statistical models. These models can be generated by any existing method, for example, the Gaussian Mixture Model (GMM). A method can also be employed that uses the feature parameter representing other spectra obtained by an analysis different from the feature parameter extraction of the speech recognition in the speech feature parameter extraction unit 302.

For fundamental frequency analysis, existing analysis such as the autocorrelation technique or the cepstrum technique can be employed. The omission is determined using the value related to periodicity instead of directly using the fundamental frequency value. To be more precise, in the case of a fundamental frequency analysis based on the cepstum technique, the maximum value within a predetermined range (within the range of a human voice pitch) of a sequence in the frequency (inverse discrete fourier transform of the logarithmic amplitude spectrum) can be used. Such value is obtained as to the head portion of the speech waveform and compared with the threshold value as in the case of waveform power. If the value is greater than the threshold value, the speech is determined to be omitted, and if the value is less than the threshold value, the speech is determined to be not omitted. Besides, a method can be employed in which an analysis is conducted to obtain harmonic structure instead of the fundamental frequency and the result is used as the feature parameter.

If it is determined that speech is omitted in step S504, the pronunciation information for the speech with an omission is set in step S505. Then, speech recognition is performed using this pronunciation information in step S506. If it is determined that the speech is not omitted in step S504, a usual speech recognition is performed in step S506. The process performed in step S505 is described in reference to FIGS. 7 to 11. In the process of step S505, the target words to be recognized are "Tokyo", "Hiroshima", "Tokushima", and "Tu". FIG. 7 shows examples of the target words to be recognized, and information on the word ID, transcription, and pronunciation (phoneme) are maintained. The reference pattern in the speech recognition process is generated by connecting to the acoustic model 306 (for example, phoneme HMM) according to the pronunciation (phoneme) sequence (7 phonemes /t o o k y o o/ in the case of "Tokyo"). FIG. 8 shows the target words to be recognized in the case where the first phoneme is deleted from the pronunciation information in FIG. 7. For example, in the case of "Tokyo", the first phoneme /t/ is deleted so that the target word to be recognized becomes /o o k y o o/. FIG. 9 and FIG. 10 show target words to be recognized in the case where phonemes to the second and fourth ones have been deleted. In the case of "Tu", the pronunciation sequence is two phonemes, /ts u/. Therefore, there will be no pronunciation sequence if more than two phonemes are deleted. In such a case, a silence model (SIL) is assigned as the pronunciation sequence. Additionally, in the case of "Hiroshima" and "Tokushima" in FIG. 10, the same pronunciation sequence (/s h i m a/) will be obtained if the first four phonemes are deleted. If it is determined that speech is not omitted in step S504, speech recognition is performed in step S506 only on the target words in FIG. 7. On the other hand, if it is determined that speech is omitted in step S504, speech recognition is performed in step S506 on target words in FIG. 8 to FIG. 10 in addition to the target words in FIG. 7. In the target words in FIG. 8 to FIG. 10, the head portion of the pronunciation sequences have been deleted. It can be determined whether speech is omitted by performing the speech analysis in step S503 and the speech omission determination in step S504. However, the length of the omitted speech or the number of phonemes cannot be estimated. Therefore, it is necessary to decide beforehand on the appropriate number of deleted phonemes of the target word which is to be added. The number can be set empirically, or set considering the tendency of speech to be omitted depending on an operation or movement of the user, or set considering the recognition performance. All the combinations of the words in which the pronunciation sequences of the first to fourth phonemes have been deleted can be targets to be recognized. In such a case, the target words as shown in FIG. 11 are set as the pronunciation information about speech omission.

Figure 17:
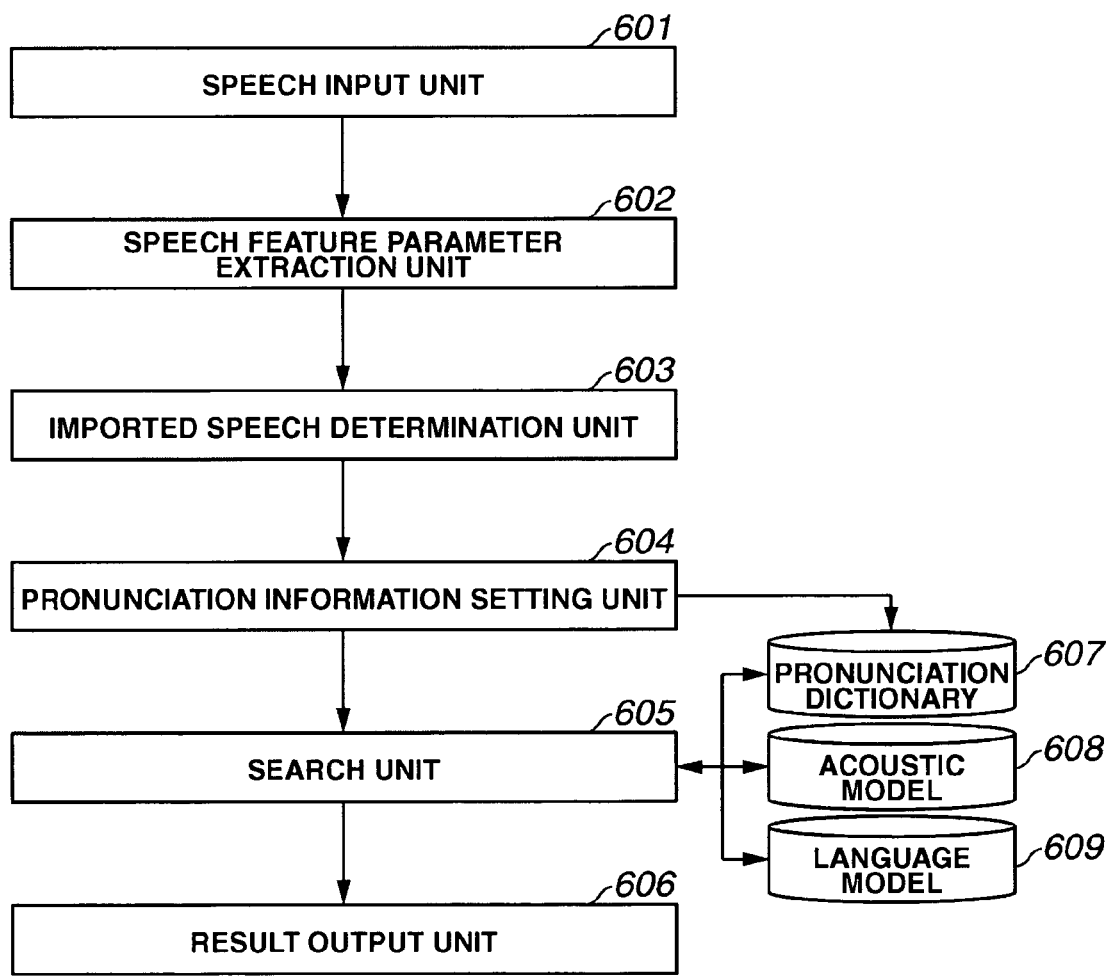
FIG. 17 is a block diagram of the module configuration of the speech recognition method. The speech recognition method includes the determination of imported speech and the setting of pronunciation information within the speech recognition process.

The spectral analysis or the fundamental frequency analysis in step S503 are processes that are the same as or similar to the speech feature parameter extraction in the speech recognition process. Therefore, these processes can be included in the speech recognition unit 204 and executed as configured within the speech recognition unit 204. FIG. 17 is a block diagram of the module configuration of a speech recognition method which includes imported speech determination and pronunciation information setting in the speech recognition process. The imported speech determination unit 202 and the pronunciation information setting unit 203 are included respectively as the imported speech determination unit 603 and the pronunciation information setting unit 604 in the process of FIG. 3. Since the components from speech input unit 601 to the language model 609 are the same as those in FIG. 2 and FIG. 3, their descriptions are omitted.

Furthermore, the speech analysis is not necessarily conducted in step S503 using only the first frame of speech, but information about a plurality of frames (for example, from the first to five frames) can also be used. Additionally, in order to determine whether speech is omitted, the present invention is not limited to using a predetermined value when the threshold value is compared, as shown in step S504. Other processes can be performed, for example, the waveform power of the first frame and the tenth frame are compared. In this case, if the waveform power of the first frame is much smaller than the tenth frame (for example, less than 10%), it is determined that there is no speech omission.

In step S504, an example of determining whether speech is omitted was given. However, the present invention is not limited to this example and it can be configured so as to determine whether the speech import is started in the midst of the user's speech.

According to the above exemplary embodiment, the degradation of recognition performance can be prevented even if the user does not input the command to start speech at the correct time. As a result, users who are not used to operating a speech recognition device can feel at ease in performing the operation.

Second Exemplary Embodiment

Figures 12, 13, 14:
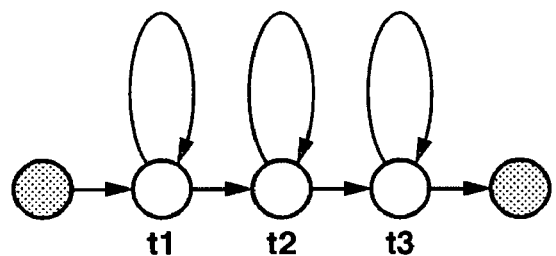
FIG. 12 is an example in which phoneme/t/ is modeled by three states of the hidden Marcov model (HMM).
FIG. 13 is an example of the target words to be recognized. The pronunciation information of the words to be recognized in FIG. 7 is expressed by the state sequences of the HMM.
FIG. 14 is an example of the target words to be recognized in FIG. 13, in which the first state sequences have been deleted.

In the first exemplary embodiment, the pronunciation of the word to be recognized is phonemicized, and the pronunciation sequence for the reading is deleted to set the pronunciation information about the omitted speech in step S505. However, the invention is not limited to this embodiment. The pronunciation of the target word to be recognized can be expressed using a pronunciation sequence which is more detailed compared to phonemes, and the detailed pronunciation sequence is deleted. To be more precise, when speech recognition is performed based on the Hidden Markov Model (HMM), phonemes are usually modeled by a plurality of states. This state sequence is viewed as the detailed pronunciation sequence and deleted at the state level. In this manner, pronunciation information can be set more precisely compared to the deletion at the phoneme level. FIG. 12 is an example in which phoneme/t/ is modeled by three states (t1, t2, t3) of HMM. When the pronunciation of FIG. 7 is described by such state sequence, an expression as shown in FIG. 13 is possible. In this case, if the first state sequence is deleted in the state sequence of FIG. 13, FIG. 14 can be obtained.

FIGS. 15A, 15B, and 15C are schematic diagrams illustrating the difference between the deletion of a pronunciation (phoneme) sequence and the deletion of a state sequence. In the case where all phonemes are modeled by three states of HMM, the pronunciation sequence of "Tokyo" /t o o k y o o/ is expressed by linking of HMM as shown in FIG. 15A. If the first phoneme (/t/) is deleted, all of three HMM states of /t/ are deleted as shown in FIG. 15B. However, if the detailed pronunciation sequence of "Tokyo" is expressed by the state sequence of HMM, it is possible to delete only the first state t1 of HMM as shown in FIG. 15C. That is, more detailed pronunciation information can be set by deleting at the state level instead of at the phoneme level. As an alternative, the same process can also be performed using general state transition models instead of HMM which was described above.

Third Exemplary Embodiment

The pronunciation information according to the above exemplary embodiment is set in a case where the target word to be recognized can be expressed as a pronunciation sequence or a detailed pronunciation sequence. However, the above setting can be utilized also in widely used speaker-independent speech recognition based on phoneme HMM (speech recognition method of the type not requiring registration). More specifically, the phoneme or the state sequence cannot be identified from the reference pattern in a speaker-dependent speech recognition (speech recognition method of the type requiring registration). In the speaker-dependent speech recognition, a reference pattern is registered by speech before using the speech recognition. Accordingly, the method described in the above exemplary embodiment cannot be used. However, if the feature parameter sequence of the reference pattern is directly used, it becomes possible to set the pronunciation information for the omitted speech.

Figure 4:
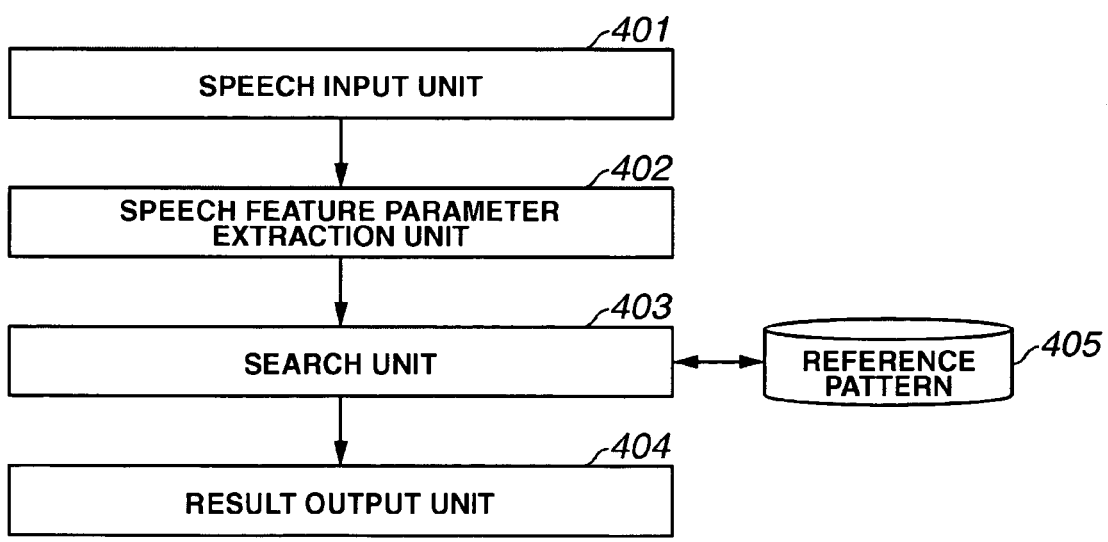
FIG. 4 is a block diagram of the module configuration of a typical, speech recognition method of the type requiring registration.

FIG. 4 is a block diagram showing the module configuration of a speech recognition method of the type requiring registration. Since blocks from a speech input unit 401 to a result output unit 404 are the same as the speech input unit 301 to the result output unit 304, illustration of these units is omitted. The target word to be recognized is preliminarily registered by speech. A reference pattern 405 is retained as the feature parameter sequence of the registered speech. It is assumed that the feature parameter sequence is preserved as the 12th order cepstrum and the deltacepstrum (c1-c12, Δc1-Δc12) which is the primary regression coefficient of the 12th order cepstrum. In this case, the feature parameter sequence of the registered speech for the word "Tokyo" is retained as a reference pattern sequence (24-dimensional vector sequence) as shown in FIG. 16A (T1 is a number of frames in analyzing the registered speech). If it is determined that speech is omitted in step S504, the first few frames are deleted from the reference pattern, as shown in FIG. 16B (the first frame deleted) or FIG. 16O (the first and second frames deleted). By speech recognition for the feature parameter sequence including the deleted one, speech recognition is carried out with little degradation with respect to speech input in which the beginning of the speech is omitted.

The object of the present invention can also be achieved by supplying a storage medium storing the program code of the software which realizes the functions of the above exemplary embodiment to a system or an apparatus, and by the computer (or CPU or MPU) of the system or the apparatus retrieving and executing the program code stored in the storage medium.

In this case, the program code itself that is retrieved from the storage medium realizes the function of the above exemplary embodiment, and the storage medium that stores the program code can constitute the present invention.

Examples of the storage medium for supplying the program code are a flexible disk, hard disk, optical disk, magnet-optical disk, CD-ROM, CD-R, magnetic tape, nonvolatile memory card, and ROM.

Furthermore, in addition to realizing the functions of the above exemplary embodiment by executing the program code retrieved by a computer, the present invention includes also a case in which an operating system (OS) running on the computer performs a part or the whole of the actual process according to the instructions of the program code, and that process realizes the functions of the above exemplary embodiment.

Furthermore, the present invention includes also a case in which, after the program code is retrieved from the storage medium and loaded onto the memory in the function extension unit board inserted in the computer or the function extension unit connected to the computer, the CPU in the function extension board or the function extension unit performs a part of or the entire process according to the instruction of the program code and that process realizes the functions of the above exemplary embodiment.

The present invention can of course be implemented in hardware, or by a combination of hardware and software.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2005-065355 filed Mar. 9, 2005, which is hereby incorporated by reference herein in its entirety.

What is claimed is:

1. A speech recognition method comprising:
  a step for starting input of speech made by a user in response to a user's operation;
  a step for determining whether beginning of the input speech is missing;
  a step for setting pronunciation information for recognizing the input speech of which the beginning is not missing in a case where a head portion of a speech waveform power does not exceed a predetermined threshold value, and setting pronunciation information for recognizing the input speech of which the beginning is missing in a case where the head portion of the speech waveform power exceeds the predetermined threshold value; and
  a step for recognizing the input speech using the set pronunciation information.

2. The speech recognition method according to claim 1, wherein determination whether the beginning of the input speech is missing in the determining step is made using information about at least one of a zero-crossing rate, spectral information, and a feature parameter representing a harmonic structure.

3. The speech recognition method according to claim 1, wherein the pronunciation information is at least one of a pronunciation sequence related to reading of a target word to be recognized, a detailed pronunciation sequence which is a state sequence of a pronunciation sequence which has been modeled by a state translation model, and a reference pattern sequence related to the target word to be recognized.

4. The speech recognition method according to claim 3, wherein the reference pattern sequence is a feature parameter sequence of a registered speech in a speech recognition apparatus of the type requiring registration.

5. The speech recognition method according to claim 1, wherein the step for inputting speech starts input of speech in accordance with a user's operation.

6. The speech recognition method according to claim 1, wherein the step for inputting speech starts input of speech in accordance with a user's movement detected by a sensor.

7. A computer-readable medium having stored thereon a control program for causing a computer to perform the speech recognition method according to claim 1.

8. A speech recognition method, comprising:
  a step for starting input of speech made by a user in response to a user's operation;
  a step for determining whether a head portion of a speech waveform power exceeds a predetermined threshold value;
  a step for setting pronunciation information for recognizing the input speech of which the beginning is not missing in a case where the head portion of the speech waveform power does not exceed the predetermined threshold value, and setting pronunciation information for recognizing the input speech of which the beginning is missing in a case where the head portion of the speech waveform power exceeds the predetermined threshold value; and
  a step for recognizing the input speech using the set pronunciation information.

9. A computer-readable medium having stored thereon a control program for causing a computer to perform the speech recognition method according to claim 8.

10. A speech recognition apparatus comprising:
  a speech inputting unit configured to start input of speech made by a user in response to a user's operation;
  a determination unit configured to determine whether beginning of the input speech is missing;
  a setting unit configured to set pronunciation information for recognizing the input speech of which the beginning is not missing in a case where a head portion of a speech waveform power does not exceed a predetermined threshold value, and setting pronunciation information for recognizing the input speech of which the beginning is missing in a case where the head portion of the speech waveform power exceeds the predetermined threshold value; and
  a speech recognition unit configured to recognize the input speech using the set pronunciation information.

11. The speech recognition apparatus according to claim 10, wherein the determination whether the beginning of the input speech is missing in the determination unit is made using information about at least one of a zero-crossing rate, spectral information, and a feature parameter representing a harmonic structure.

12. The speech recognition apparatus according to claim 10, wherein the pronunciation information in the setting unit is at least one of a pronunciation sequence related to reading of the target word to be recognized, a detailed pronunciation sequence which is a state sequence of a pronunciation sequence which has been modeled by a state translation model, and a reference pattern sequence related to the target word to be recognized.

13. A speech recognition apparatus comprising:
  a speech inputting unit configured to start input of speech made by a user in response to a user's operation;
  a determination unit configured to determine whether a head portion of a speech waveform power exceeds a predetermined threshold value;
  a setting unit configured to set pronunciation information for recognizing the input speech of which the beginning is not missing in a case where the head portion of the speech waveform power does not exceed the predetermined threshold value, and setting pronunciation information for recognizing the input speech of which the beginning is missing in a case where the head portion of the speech waveform power exceeds the predetermined threshold value; and
  a speech recognition unit configured to recognize the input speech using the set pronunciation information.

* * * * *